Jan. 10, 1961   B. M. BLOUNT   2,967,591
BRAKE MECHANISM
Filed April 7, 1959

INVENTOR
*Beverley M. Blount*

BY
ATTORNEYS

United States Patent Office 2,967,591
Patented Jan. 10, 1961

2,967,591
BRAKE MECHANISM

Beverley M. Blount, Chevy Chase, Md., assignor to the United States of America as represented by the Secretary of the Navy Filed Apr. 7, 1959, Ser. No. 804,853

3 Claims. (Cl. 188—69)

This invention relates to wheel brake structures; more particularly it relates to an improved caster brake mechanism.

In certain material handling applications involving movable dollies, it is highly desirable that the pivoted dolly casters be provided with brake mechanisms that will be positive in operation yet easy to engage and release. Such applications include particularly casters employed on dollies used for transporting heavy equipment or components, as it is obvious that failure of caster brakes might well result in injury to personnel or to the equipment being handled.

One object of the present invention, therefore, is to provide a caster brake mechanism that will, when engaged, resist substantial forces tending to turn the caster wheel, but which will require a minimum effort for effecting release under load.

Another object of the invention resides in the provision of a brake mechanism that will operate effectively regardless of the position of the caster on its pivot.

A further object of the invention is to provide a caster brake mechanism employing a toggle linkage and spring arrangement that will assure positive engagement of latches or detents instead of the usual type brake shoes with the studs secured to the sides of the caster wheel, for effectually locking the latter.

A further object of the invention is to provide a brake mechanism of the character stated hereinabove that will be of simple and rugged construction and thus able to withstand hard usage.

Other objects and many of the attendant advantages of this invention will be readily appreciated as the same becomes better understood by reference to the following detailed description when considered in connection with the accompanying drawings wherein.

Figures 1, 2:
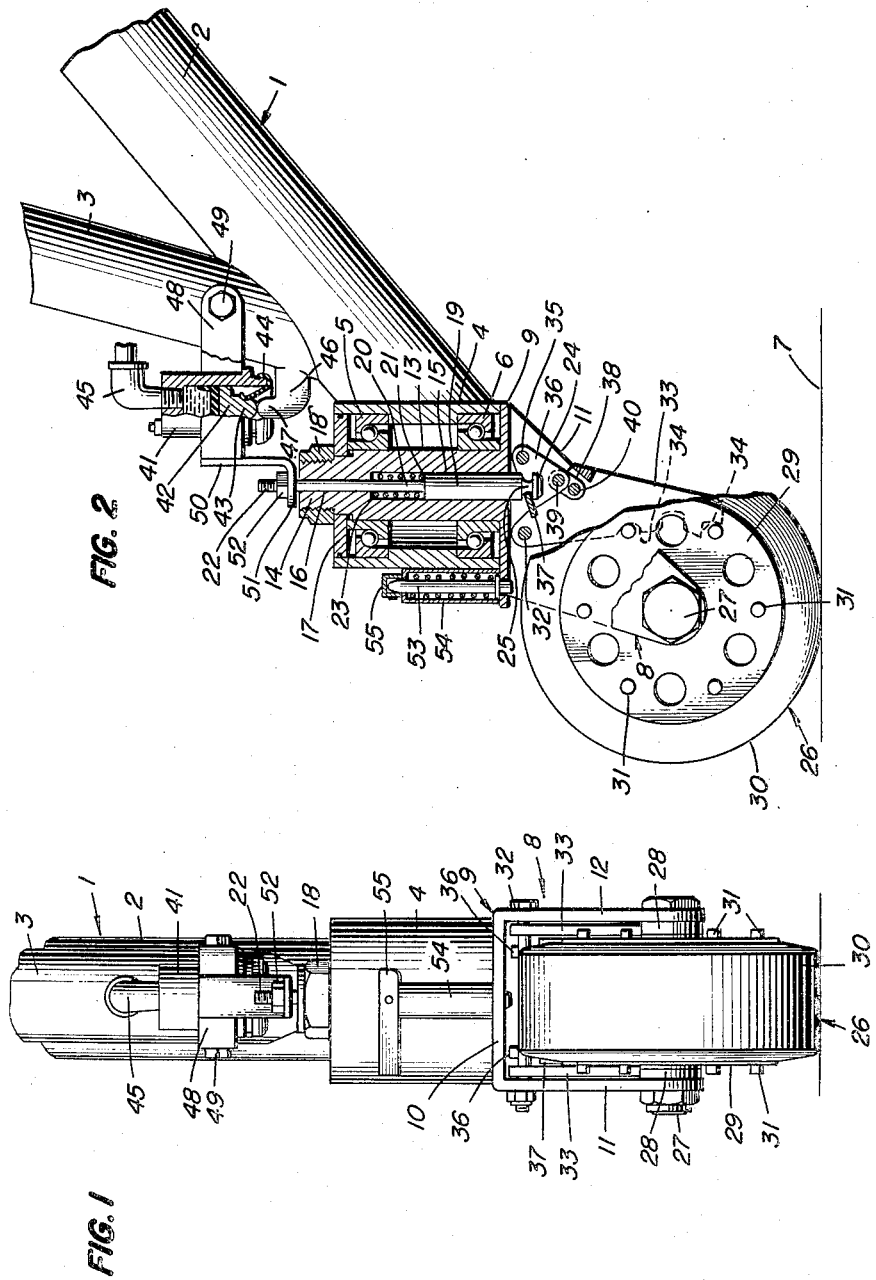
Fig. 1 is a front elevation of the improved caster brake mechanism.
Fig. 2 is a side elevation, partly in section of the caster brake mechanism.

Referring now more particularly to the drawings, the numeral 1 indicates generally a supporting frame which may conveniently be a part of a material handling dolly. The frame 1 includes a leg 2 and a brace 3, both formed of hardened steel tubing, the brace having its lower end connected to the leg near its lower end. Fixed to the lower end of the leg is a cylindrical caster mount 4 which has its inner wall formed with recesses to receive upper and lower bearings 5 and 6. As best seen in Fig. 2, the caster mount 4 is so connected to the leg 2 that although the leg extends at an angle above a supporting surface, indicated at 7, the mount will be positioned with its axis normal to the surface.

Mounted for pivotal movement about the caster mount 4 is a caster unit 8 having a yoke 9 provided with a flat bight 10 and spaced parallel legs 11 and 12. Formed integrally with the bight 10 and rising vertically therefrom is a stem 13 having a reduced threaded upper end portion 14. The stem 13 is formed with an axial recess 15 which extends from the lower end of the stem throughout substantially two-thirds of its height. Communicating between the upper end of the recess and the upper end of the stem is a bore 16. The bearings 5 and 6 journal the stem 13 and thus assure 360 degrees rotation of the caster unit 8 in the mount 4. For retaining the caster unit and the caster mount in assembled relation, a plate 17 and a nut 18 are employed, the plate closing the upper end of the caster mount and the nut being screwed on the threaded end portion 14 and retaining the plate in position.

A plunger 19 is mounted for vertical sliding movement in the axial recess 15. The plunger has a reduced diameter actuating rod 20 defining a shoulder 21, the rod extending upwardly through the bore 16 and having a threaded upper end portion 22 extending above the upper end of the stem 13. Confined in the recess 15 between the shoulder 21 and the upper end of the recess, and surrounding said rod 20, is a coil spring 23 which normally urges the plunger downwardly. At its lower end the plunger is formed with a head 24 which defines an annular groove 25.

A caster wheel 26 is mounted for rotation in the yoke 9 by a pin or stub shaft 27 and bushings 28. The caster wheel 26 includes side plates 29 and a tire 30, each of the side plates being provided with pins or studs 31 arranged in a circumferentially spaced series. As best seen in Fig. 1, a pivot rod 32 extends through the legs 11 and 12 of the yoke 9 near to and parallel with the underside of the bight 10, forward of the center of the bight. Mounted for swinging movement on the rod 32 and straddling the wheel 30 are locking detents or latches 33 which are flat and of generally triangular shape, and are preferably formed of heavy sheet metal. The forward edge of each of the detents or latches 33 is formed, near its lower end, with spaced notches 34 for selective engagement with the pins or studs 31 on the plates 29.

A second pivot rod 35 extends through the yoke 9 parallel to the rod 32 and rearwardly thereof. The rod 35 mounts a pair of spaced actuating links, one of which is shown at 36 in Fig. 2. An actuating bar 37 extends between the forwardmost corners of the links 36 and has the center portion of its rear edge positioned in the annular groove 25 in the plunger 19. Toggle links, one of which is shown at 38 in Fig. 2, connect the actuating links 36 with the latches 33. More specifically, the toggle links 38 are pivotally connected to the latches and actuating links by connecting rods 39 and 40, the rod 39 extending through the lowermost corners of the actuating links and the rod 40 passing through the rearmost corners of the latches. It should be noted that the toggle links are located in substantially the same vertical plane as the axis of the plunger 19, so that only a relatively small amount of energy, from the spring 23, will be required to engage the detents or locking elements 33 with the studs 31.

It should also be observed that, when received by notches 34 in their respective latch 33, each of the studs 31 so received is in such a position that a radius passing therethrough will lie tangent to the rod 32. The result of this construction is that maximum braking force may be applied to the latches. The notches 34 in the latches have slightly inclined walls so that they may be easily disengaged from the studs during a brake releasing operation.

The spring 23 exerts sufficient pressure on the plunger 19 normally to maintain the detents or latches 33 in braking positions in engagement with studs 31. For overcoming the spring pressure, when it is desired to release the brake, the mechanism now to be described is employed. The release mechanism includes a cylinder 41 having a piston 42 therein, the piston having an axially extending projection 43 provided with a hemispherical end portion. A rubber sealing member 44 closes the lower end of the cylinder below the piston, and a fitting 45, screwed into the upper end of the cylinder, provides an inlet for brake fluid under pressure from a suitable source (not shown). A bracket 46 is formed integral with the brace 3 above the caster mount 4 and has an upwardly extending projection 47 formed with a hemispherical upper end which is engaged with the hemispherical end portion of the projection 43 on the piston 42. The cylinder 41 is pivotally connected to the brace 3, near its lower end, by a U-shaped strap 48 and a pivot bolt 49, and depending from the bight portion of the strap is a lever 50 having a lateral extension 51 which fits over the threaded upper end 22 of the actuating rod 20 of the plunger 19. A nut 52 retains the plunger and lever connected in cooperating relation.

A spring pressed locking plunger 53, mounted in a housing 54 secured to the front of the caster mount 4, has its lower end portion engaged in an opening in the forward end of the bight 10 of the yoke 9. The locking plunger 53 functions to maintain the caster oriented forwardly, i.e., in the same vertical plane as the supporting frame 1. A lever 55 is pivotally connected to the upper end of the plunger 53 and may be lifted for displacing the lower end of the plunger from the opening in the bight, when the caster may be rotated about the axis of the stem 13.

In operation, the brake is normally held "on," by the action of the spring 23 urging the plunger 19 downwardly, for shifting the actuating links 36 and toggle links and rocking the detents or latches into engagement with the studs 31. When it is desired to release the brake, fluid under pressure is admitted to the cylinder 41 through the fitting 45 for rocking the cylinder 41 and strap 48 upwardly about the pivot bolt 49, when the lever 50 will be raised for lifting the plunger 19 against the compression of the spring 23. Upward movement of the plunger will raise the actuating bar 37 and this action will result in the upward movement of the links 36 and 38 and the rearward movement of the detents or latches about the axis of the pivot rod 32, when the notches 34 in the detents or latches will clear the studs 31. As long as fluid under pressure is maintained in the cylinder, the brake will be maintained in the "off" position.

As will be obvious, the spring may be so arranged that the plunger will normally retain the brake "off," and fluid pressure acting in the cylinder employed for putting it "on."

Obviously many modifications and variations of the present invention are possible in the light of the above teachings. It is therefore to be understood that within the scope of the appended claims the invention may be practiced otherwise than as specifically described.

What is claimed is:

1. In a caster brake mechanism, a caster mount, a caster unit having a yoke provided with a vertical stem, bearings journaling the stem in the caster mount, a caster wheel, means rotatably mounting the caster wheel in the yoke, said wheel having side plates, studs projecting from the side plates, a locking detent having forward and rearward edges and disposed adjacent the caster wheel at each side thereof, means pivotally mounting the locking detents at the upper end thereof about a horizontal axis on the yoke, said locking detents having notches on the forward edge thereof for engagement by the studs, a plunger vertically movable in the stem and having an annular groove at the lower end thereof, means connecting the plunger with the locking detents, said last-mentioned means including actuating links, an actuating bar carried by and connected between the links and engaging said groove in the plunger, toggle links connecting the actuating links with the locking detents; a spring normally urging the plunger in a downward direction for shifting the actuating bar, links, and locking detents downwardly whereby said studs will engage in the notches for locking the caster wheel against rotation, and fluid pressure operated means connected to the upper end of the plunger for shifting the plunger against the compression of the spring for moving said actuating bar, links, and locking detents upwardly to move the locking detents out of engagement with the studs whereby said caster wheel will be released for rotation.

2. A caster brake mechanism including a caster mount, a supporting frame for said caster mount, a caster unit swiveled in the mount and including a yoke, a caster wheel rotatably mounted in the yoke, a plurality of transversely projecting and circumferentially arranged studs carried by said caster wheel and disposed in spaced relation with respect to the axis of rotation thereof, a latch member pivotally mounted at one end to the yoke and having a stud receiving notch on one edge thereof and adjacent said studs for locking engagement therewith, a spring urged plunger vertically disposed and slidably mounted within the caster mount, an annular groove formed on one end of the plunger, a plunger actuated link pivotally mounted on the yoke and connected to said latch member, a toggle link connecting the latch member to the plunger actuated link, means carried by said actuated link in engagement with said groove in the plunger and with the latch member for maintaining the toggle link, actuating link and the latch member in a position so that the notch in the latch member is in locking engagement with the studs until said plunger is actuated, a bracket connected to the other end of said plunger and controlled by fluid pressure for actuating the plunger to operate said links, actuating means and latch member an amount sufficient to release the notch in the latch member from locking engagement with the studs, and a fluid pressure device connected to said bracket.

3. In a caster brake mechanism, mounting means, a caster unit including a yoke having a stem, means journaling the stem in the mounting means, a caster wheel rotatably mounted in said yoke, supporting means carried by and disposed on opposite sides of the wheel, a plurality of circumferentially disposed studs mounted on said supporting means in spaced relationship and transversely projecting therefrom at each side thereof, pivotally mounted locking means on said yoke and disposed adjacent said supporting means and having stud engaging notches on one edge thereof, said locking means being movable into and out of engagement with said studs, movable means disposed within said stem and movable vertically therein and operatively connected to said locking means, an annular groove formed in one end of said movable means, pivotally mounted actuating links carried by said yoke and connected to said locking means, means connecting said actuating links to the locking means, an actuating bar carried by said actuating links in engagement with the groove in said movable means for operatively connecting the locking means to said movable means, resilient means in engagement with the movable means and normally urging the movable means and actuating links in a downward direction an amount sufficiently to maintain the actuating bar in engagement with the locking means and the notches in the locking means in engagement with the studs thereby to lock and maintain the caster wheel against rotation, fluid pressure actuated means connected to the other end of the movable means for moving the movable means and actuating links in an upwardly direction an amount sufficient to maintain the notches in the locking means out of locking engagement with the studs thereby to release the caster wheel for rotation, and a fluid pressure device connected to said pressure actuated means.

References Cited in the file of this patent

UNITED STATES PATENTS

| | | |
|---|---|---|
| 50,402 | Stoops | Oct. 10, 1865 |
| 498,271 | Hoobler | May 30, 1893 |
| 1,599,485 | Perin | Sept. 14, 1926 |
| 1,671,774 | McIntosh | May 29, 1928 |
| 1,869,085 | Williamson | July 26, 1932 |
| 2,176,472 | Rogers et al. | Oct. 17, 1939 |

FOREIGN PATENTS

| | | |
|---|---|---|
| 527,830 | Canada | July 17, 1956 |